(12) United States Patent
Liao

(10) Patent No.: US 11,077,917 B2
(45) Date of Patent: Aug. 3, 2021

(54) BRAKE AND SHIFT CONTROL ASSEMBLY

(71) Applicant: TEKTRO TECHNOLOGY CORPORATION, Changhua County (TW)

(72) Inventor: I-Chun Liao, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 72 days.

(21) Appl. No.: 16/259,029

(22) Filed: Jan. 28, 2019

(65) Prior Publication Data

US 2019/0270494 A1 Sep. 5, 2019

(30) Foreign Application Priority Data

Mar. 2, 2018 (TW) .................................. 107106932

(51) Int. Cl.
*B62M 25/08* (2006.01)
*B62K 23/06* (2006.01)
*B62L 3/02* (2006.01)

(52) U.S. Cl.
CPC ............... *B62M 25/08* (2013.01); *B62L 3/02* (2013.01); *B62K 23/06* (2013.01)

(58) Field of Classification Search
CPC ........... Y10T 74/2003; Y10T 74/20037; Y10T 74/2014
See application file for complete search history.

(56) References Cited

U.S. PATENT DOCUMENTS

| 6,073,730 | A   | * | 6/2000  | Abe ........................ | B60T 7/085 188/24.11 |
|-----------|-----|---|---------|----------------------------|----------------------|
| 6,282,976 | B1  | * | 9/2001  | Jordan .................... | B62K 23/04 474/82    |
| 7,854,180 | B2  | * | 12/2010 | Tetsuka .................. | B62M 25/04 74/473.12 |
| 9,858,807 | B2  | * | 1/2018  | Hamlin ................... | B62K 23/02           |
| 2017/0080993 | A1 | * | 3/2017 | Bierwerth ............. | B62K 23/06           |
| 2019/0315436 | A1 | * | 10/2019 | Wu ........................ | B62K 21/12          |

* cited by examiner

*Primary Examiner* — Bobby Rushing, Jr.
(74) *Attorney, Agent, or Firm* — Locke Lord LLP; Tim Tingkang Xia, Esq.

(57) ABSTRACT

The disclosure provides a brake and shift control assembly configured to be mounted on a bicycle handlebar. The bicycle handlebar includes two handlebar parts and a middle part connected to and located between the two handlebar parts. The brake and shift control assembly includes a brake module and a shift control module. The brake module is configured to be mounted on one of the handlebar parts. The shift control module includes an assembly seat, a circuit board assembly, a battery, and an antenna. The assembly seat is configured to be disposed on an end of one of the handlebar parts away from the middle part. The circuit board assembly is disposed in the assembly seat, and the battery and the antenna are disposed on the circuit board assembly.

4 Claims, 7 Drawing Sheets

US 11,077,917 B2

BRAKE AND SHIFT CONTROL ASSEMBLY

CROSS-REFERENCE TO RELATED APPLICATIONS

This non-provisional application claims priority under 35 U.S.C. § 119(a) on Patent Application No(s). 107106932 filed in Taiwan, R.O.C on Mar. 2, 2018, the entire contents of which are hereby incorporated by reference.

TECHNICAL FIELD

The disclosure relates to a brake and shift control assembly, more particularly a brake and shift control assembly having an antenna that is disposed on an end of a handlebar part.

BACKGROUND

In recent years, road bikes, mountain bikes and other types of bicycles are all popular in the market, and it motivates bicycle manufacturers to pay more attention on improving their products. In general, the bicycle is usually provided with derailleurs to shift the chain so as to adjust a gear ratio of front sprockets to rear sprockets. In order to precisely shift the chain and to increase the sensitivity in controlling the derailleurs, an electronic gear-shifting derailleur system is developed.

Generally, an electronic gear-shifting system electrically connects the derailleurs and the control on the handlebar via wires, such that upshift/downshift signal produced by the control can be transmitted to the derailleur.

SUMMARY OF THE INVENTION

One embodiment of the disclosure provides a brake and shift control assembly configured to be mounted on a bicycle handlebar. The bicycle handlebar includes two handlebar parts and a middle part connected to and located between the two handlebar parts. The brake and shift control assembly includes a brake module and a shift control module. The brake module is configured to be mounted on one of the handlebar parts. The shift control module includes an assembly seat, a circuit board assembly, a battery, and an antenna. The assembly seat is configured to be disposed on an end of one of the handlebar parts away from the middle part. The circuit board assembly is disposed in the assembly seat, and the battery and the antenna are disposed on the circuit board assembly.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
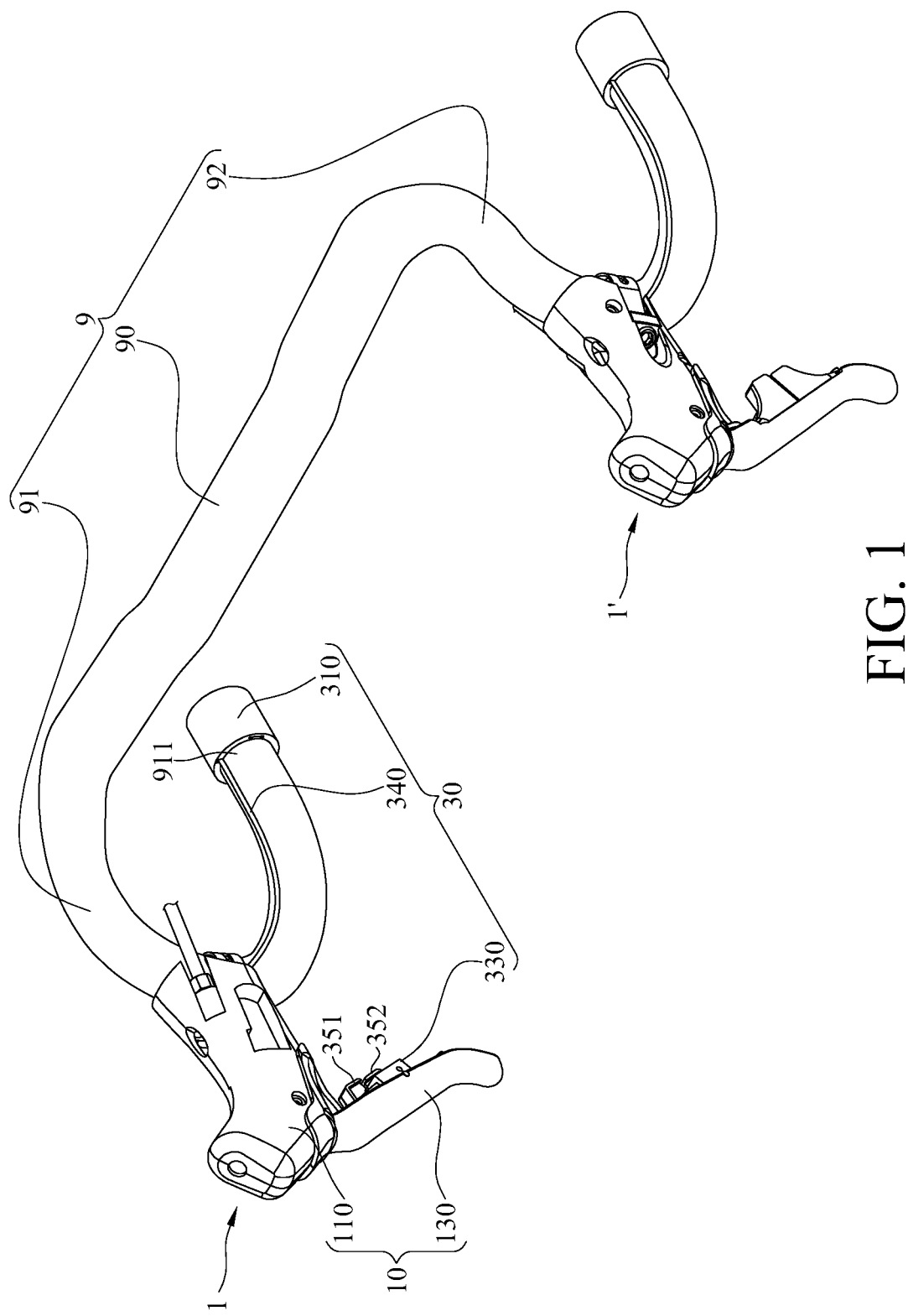
FIG. 1 is a perspective view of a brake and shift control assembly and a bicycle handlebar according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
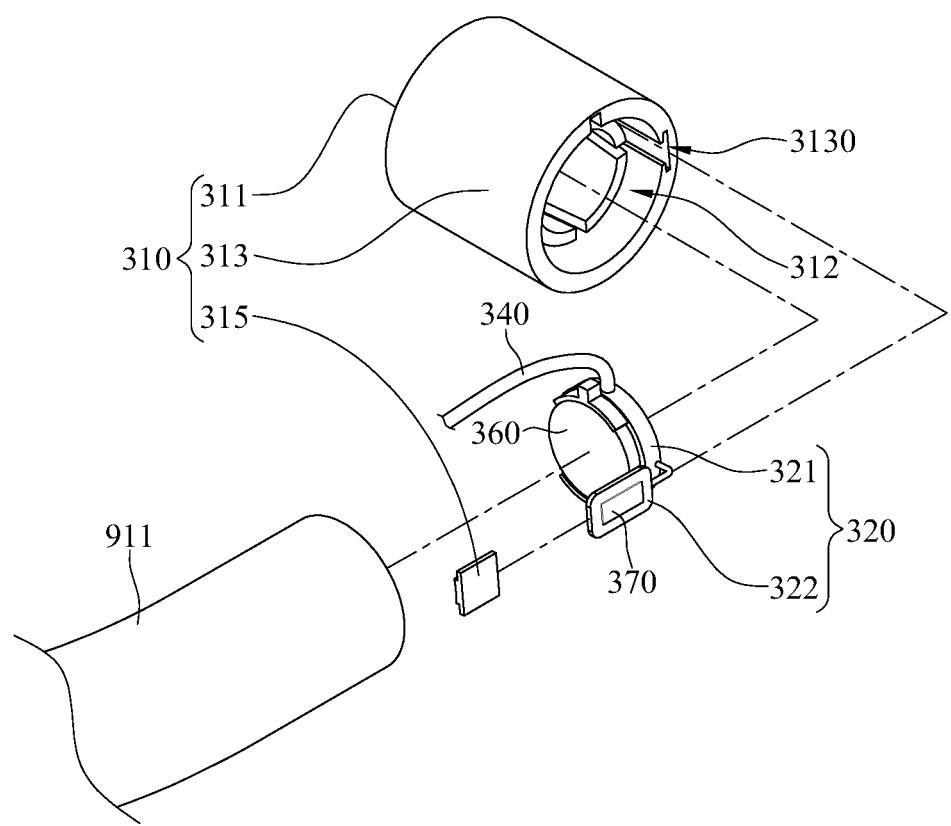
FIG. 2 is a partial exploded view of a shift control module and an end of a handlebar part of the bicycle handlebar in FIG. 1.
Figure 3:
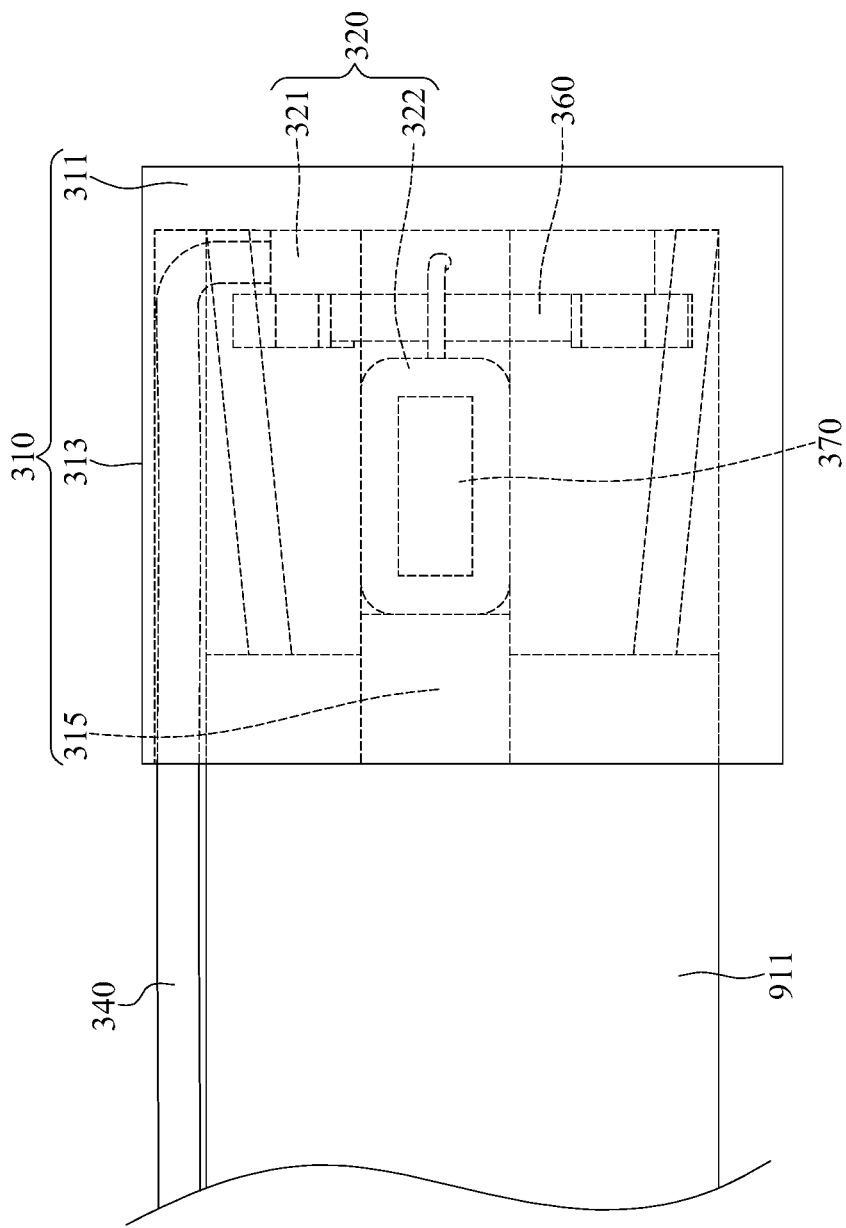
FIG. 3 is a partial enlarged schematic view of the shift control module and the end of the handlebar part of the bicycle handlebar in FIG. 1.

Please refer to FIG. 1 to FIG. 3. FIG. 1 is a perspective view of a brake and shift control assembly and a bicycle handlebar according to a first embodiment of the disclosure. FIG. 2 is a partial exploded view of a shift control module and an end of a handlebar part of the bicycle handlebar in FIG. 1. FIG. 3 is a partial enlarged schematic view of the shift control module and the end of the handlebar part of the bicycle handlebar in FIG. 1.

This embodiment provides a brake and shift control assembly 1 (may also be called assembly 1 in the following paragraphs). The brake and shift control assembly 1 is configured to be mounted on a bicycle handlebar 9. The bicycle handlebar 9 includes a middle part 90, a right handlebar part 91, and a left handlebar part 92. The middle part 90 is located between and connected to the right handlebar part 91 and the left handlebar part 92.

In this embodiment, each of the handlebar parts 91 and 92 has a portion in U-shape, but the present disclosure is not limited thereto. In some other embodiments, both the right and left handlebar parts may be straight bars.

In addition, in this or some other embodiments, there is a brake and shift control assembly 1' mounted on the left handlebar part 92, and the brake and shift control assembly 1' may or may not have the design as that of the brake and shift control assembly 1, and the present disclosure is not limited thereto. Therefore, only the brake and shift control assembly 1 is described in detail in below.

The brake and shift control assembly 1 includes a brake module 10 and a shift control module 30.

The brake module 10 includes a main body 110 and a brake lever 130. In this embodiment, the main body 110 is configured to be mounted on the right handlebar part 91 for hand to hold. The brake lever 130 is pivotably disposed on the main body 110 and is configured to produce an oil pressure in a hydraulic cylinder in the main body 110 for braking.

The shift control module 30 includes an assembly seat 310, a circuit board assembly 320, a signal generator 330, a wire 340, two shift levers 351 and 352, a battery 360, and an antenna 370.

In this embodiment, the assembly seat 310 includes a bottom portion 311 and a sidewall portion 313, and a sealing component 315. The bottom portion 311 is connected to the sidewall portion 313, and the sidewall portion 313 surrounds the bottom portion 311. The bottom portion 311 and the sidewall portion 313 together form an accommodation hole 312 therebetween. The assembly seat 310 is mounted on an end 911 of the right handlebar part 91 away from the middle part 90. The end 911 of the right handlebar part 91 is inserted into the accommodation hole 312 and is in contact with the sidewall portion 313. In addition, the sidewall portion 313 has an engaging groove 3130 in the accommodation hole 312. The circuit board assembly 320 is fixed on the sidewall portion 313 by engaging with the engaging groove 3130.

The sealing component 315 is, for example, a flexible plug. The sealing component 315 is disposed at a side of the engaging groove 3130 away from the bottom portion 311 and is clamped between the end 911 of the right handlebar part 91 and the sidewall portion 313. As such, the engaging groove 3130 is sealed by the sealing component 315, such that water and/or dust is prevented from entering into the accommodation hole 312 of the assembly seat 310 from the engaging groove 3130. However, the sealing component 315 is optional; in some other embodiments, the assembly seat may not have the sealing component 315.

In this embodiment, the circuit board assembly 320 includes a first circuit board 321 and a second circuit board 322 electrically connected to the first circuit board 321. The first circuit board 321 is located in the accommodation hole 312 and is disposed on the bottom portion 311. The second circuit board 322 is disposed in the engaging groove 3130 of the sidewall portion 313. In this embodiment, the second circuit board 322 is inserted into the engaging groove 3130 so as to be fixed to the sidewall portion 313, but the present disclosure is not limited thereto. In some other embodiments, the sidewall portion may have no engaging groove; in such a case, the second circuit board 322 may be directly fixed to the sidewall portion by adhering or screwing.

The signal generator 330 is disposed on the brake lever 130, and the signal generator 330 is electrically connected to the circuit board assembly 320 in the assembly seat 310 via the wire 340. In this embodiment, the wire 340 is connected to the assembly seat 310 and disposed on the exterior of the right handlebar part 91, but the present disclosure is not limited thereto. In some other embodiments, the wire 340 may be connected to the assembly seat 310 and disposed in the interior of the right handlebar part 91.

Figure 4:
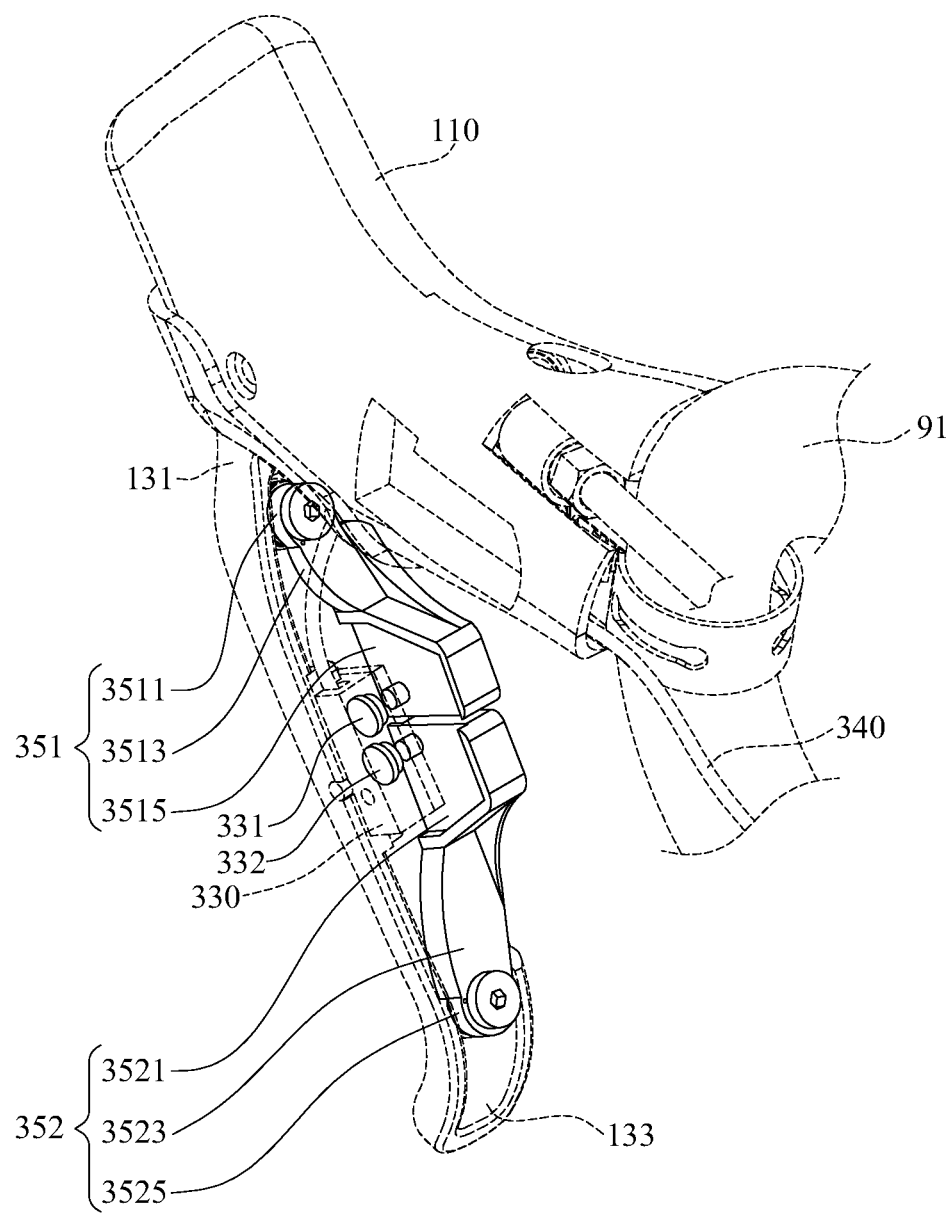
FIG. 4 is a partial perspective view of the brake and shift control assembly and the bicycle handlebar in FIG. 1.

Then, please refer to FIG. 4. FIG. 4 is a partial perspective view of the brake and shift control assembly and the bicycle handlebar in FIG. 1.

As shown in FIG. 4, the shift lever 351 includes a pivot portion 3511, a bridge portion 3513 and a push portion 3515, and the shift lever 352 includes a pivot portion 3521, a bridge portion 3523, and a push portion 3525. The bridge portion 3513 is connected to and located between the pivot portion 3511 and the push portion 3515, and the bridge portion 3523 is connected to and located between the pivot portion 3521 and the push portion 3525. The pivot portions 3511 and 3521 are respectively pivotably disposed at two opposite ends 131 and 133 of the brake lever 130 so that the shift levers 351 and 352 are able to be pivoted with respect to the brake lever 130. As such, the push portions 3515 and 3525 are respectively movable toward or away from buttons 331 and 332 on the signal generator 330. The buttons 331 and 332 can respectively be activated by being pressed by the push portions 3515 and 3525 to produce an upshift signal or downshift signal for upshifting or downshifting a derailleur.

The battery 360 is disposed on the first circuit board 321 of the circuit board assembly 320, and the antenna 370 is disposed on the second circuit board 322 of the circuit board assembly 320. The upshift and downshift signals produced by the signal generator 330 can be transmitted to the derailleur via the antenna 370 in a wireless manner. The battery 360 is configured to provide electricity to the signal generator 330 and the antenna 370.

In this embodiment, the battery 360 and the antenna 370 are respectively disposed on the bottom portion 311 and the sidewall portion 313 of the assembly seat 310; that is, the battery 360 and the antenna 370 are spaced apart from each other. Specifically, the battery 360 is not located on the path that the antenna 370 transmits signal. Therefore, the signal sent by the antenna 370 will not be interfered by the battery 360 and can be maintained at a certain level of quality.

In this embodiment, the assembly seat 310 is sleeved on the end 911 of the right handlebar part 91 in a tight fit manner. And the assembly seat 310 is able to be detached from the end 911 of the right handlebar part 91 to expose the battery 360.

Figure 5:
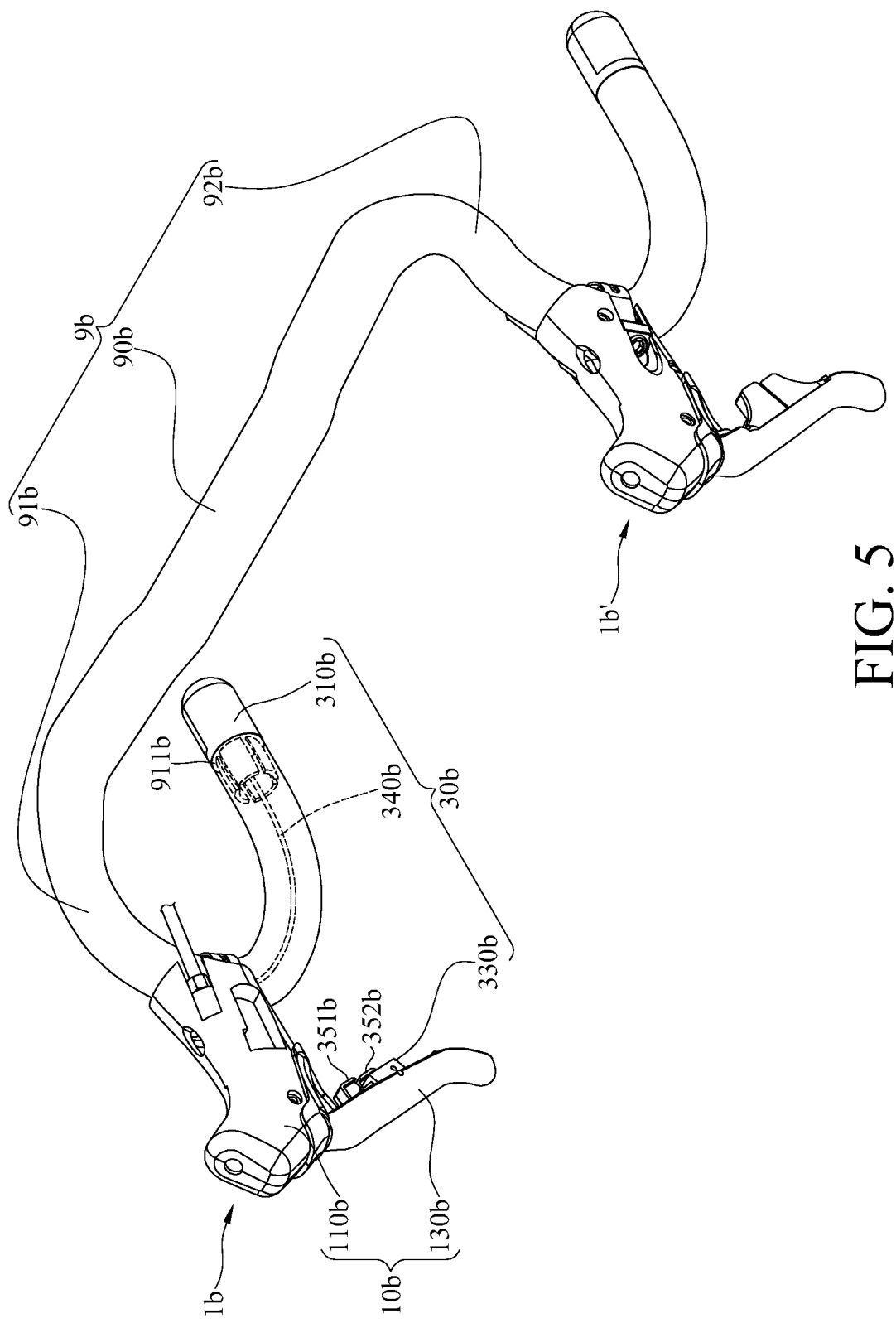
FIG. 5 is a perspective view of a brake and shift control assembly and a bicycle handlebar according to a second embodiment of the disclosure.
Figure 6:
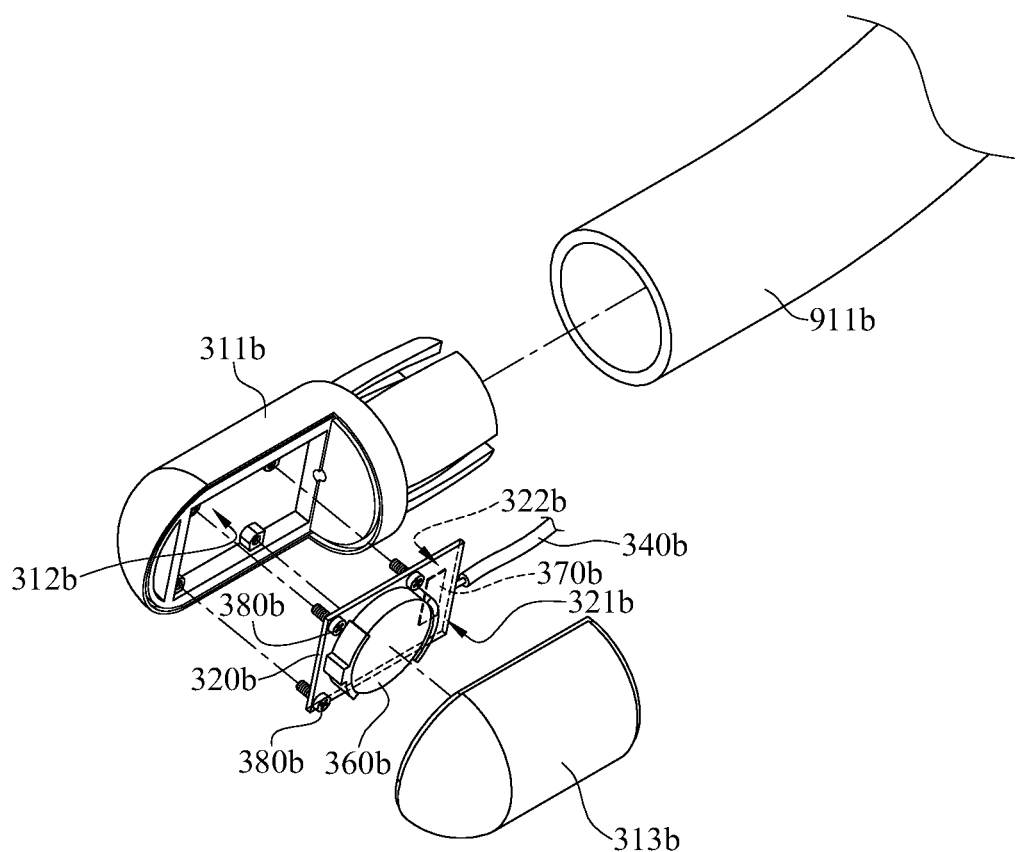
FIG. 6 is a partial exploded view of a shift control module and an end of a handlebar part of the bicycle handlebar in FIG. 5.
Figure 7:
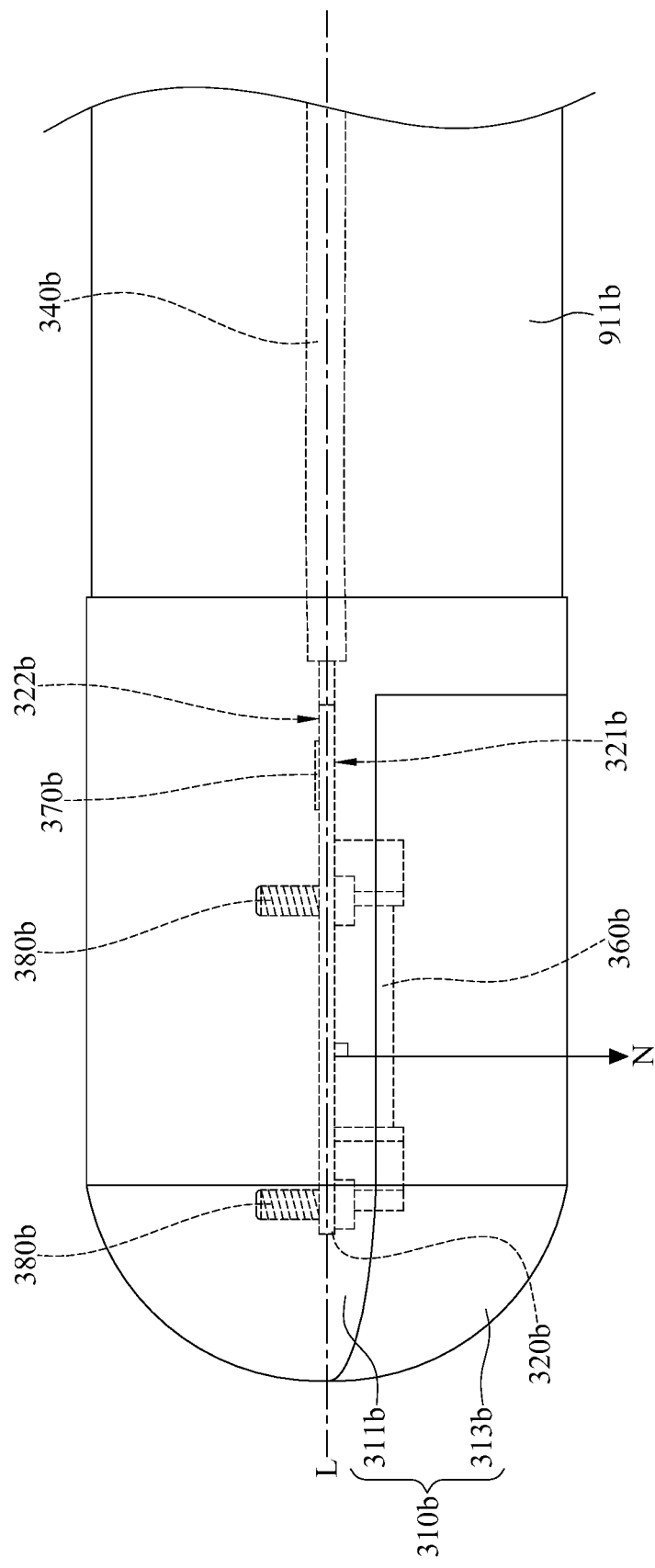
FIG. 7 is a partial enlarged schematic view of the shift control module and the end of the handlebar part of the bicycle handlebar in FIG. 5.

Note that the disclosure is not limited by the configuration that the circuit board assembly 320 includes the circuit boards 321 and 322 and the configuration that the battery 360 and the antenna 370 are respectively disposed on the circuit boards 321 and 322. In some other embodiments, the circuit board assembly may only include one circuit board; in such a case, the antenna and the battery may both disposed on the single circuit board of the circuit board assembly. In detail, please refer to FIG. 5 to FIG. 7. FIG. 5 is a perspective view of a brake and shift control assembly and a bicycle handlebar according to a second embodiment of the disclosure. FIG. 6 is a partial exploded view of a shift control module and an end of a handlebar part of the bicycle handlebar in FIG. 5. FIG. 7 is a partial enlarged schematic view of the shift control module and the end of the handlebar part of the bicycle handlebar in FIG. 5.

This embodiment provides a brake and shift control assembly 1*b*, and the brake and shift control assembly 1*b* is configured to be mounted on a bicycle handlebar 9*b*. The bicycle handlebar 9*b* includes a middle part 90*b*, a right handlebar part 91*b* and a left handlebar part 92*b*. The middle part 90*b* is located between and connected to the right handlebar part 91*b* and the left handlebar part 92*b*.

In this embodiment, each of the handlebar parts 91*b* and 92*b* has a portion in U-shape, but the present disclosure is not limited thereto. In some other embodiments, both of the right and left handlebar parts may be straight bars.

In addition, in this or some other embodiments, there is a brake and shift control assembly 1*b'* mounted on the left handlebar part 92*b*, and the brake and shift control assembly 1*b'* may or may not have the design as that of the brake and shift control assembly 1*b*, and the present disclosure is not limited thereto. Therefore, only the brake and shift control assembly 1*b* is described in detail in below.

The brake and shift control assembly 1*b* includes a brake module 10*b* and a shift control module 30*b*.

The brake module 10*b* includes a main body 110*b* and a brake lever 130*b*. In this embodiment, the main body 110*b* is configured to be mounted on the right handlebar part 91*b* for hand to hold. The brake lever 130*b* is pivotably disposed on the main body 110*b* and is configured to produce an oil pressure in a hydraulic cylinder in the main body 110 for braking.

The shift control module 30*b* includes an assembly seat 310*b*, a circuit board assembly 320*b*, a signal generator 330*b*, a wire 340*b*, two shift levers 351*b* and 352*b*, a battery 360*b* and an antenna 370*b*.

In this embodiment, the assembly seat 310*b* includes a base 311*b* and a cover 313*b*. The base 311*b* is disposed on an end 911*b* of the right handlebar part 91*b* away from the middle part 90b. The cover 313b is detachably mounted on the base 311b, and the cover 313b and the base 311b together form an accommodation space 312b therebetween. The circuit board assembly 320b is disposed in the accommodation space 312b.

In this embodiment, the circuit board assembly 320b is located in the accommodation space 312b and is fixed on the base 311b via screws 380b. The circuit board assembly 320b has a first surface 321b and a second surface 322b opposite to each other. A normal line N of the first surface 321b is substantially perpendicular to a central line L of the right handlebar part 91b; that is, the normal line N of the first surface 321b is at an angle approximately of 90 degrees to the central line L of the right handlebar part 91b, but the disclosure is not limited thereto. In some other embodiments, the normal line of the first surface may be at an acute angle to the central line of the right handlebar part.

The signal generator 330b is disposed on the brake lever 130b and electrically connected to the circuit board assembly 320b in the assembly seat 310b via the wire 340b. In this embodiment, the wire 340b is connected to the assembly seat 310b and disposed in the interior of the right handlebar part 91b.

The shift levers 351b and 352b are pivotably disposed on the brake lever 130b so that the shift levers 351b and 352b are able to pivoted with respect to the brake lever 130b. As such, the shift levers 351b and 352b are respectively movable toward or away from buttons (not numbered) on the signal generator 330d. The buttons can respectively be activated by being pressed by the shift levers 351b and 352b to produce an upshift signal or downshift signal for upshifting or downshifting a derailleur.

In this embodiment, the battery 360b and the antenna 370b are respectively disposed on the first surface 321b and the second surface 322b of the circuit board assembly 320b. The upshift and downshift signals produced by the signal generator 330b can be transmitted to the derailleur via the antenna 370b in a wireless manner. The battery 360b is configured to provide electricity to the signal generator 330b and the antenna 370b.

As shown in FIG. 6 and FIG. 7, an orthogonal projection of the antenna 370b on the circuit board assembly 320b does not overlap with an orthogonal projection of the battery 360b on the circuit board assembly 320b. As such, battery 360b is not located on the path that the antenna 370b transmits the signal. Therefore, the signal sent by the antenna 370b will not be interfered by the battery 360, and can be maintained at a certain level of quality.

In this embodiment, the cover 313b of the assembly seat 310b is detachable from the base 311b. As such, the battery 360b in the accommodation space 312b can be exposed and changed by detaching the cover 313b from the base 311b when the battery 360b is depleted.

According to the brake and shift control assembly as discussed above, since the shift control module has the antenna disposed therein, the upshift signal and the downshift signal produced by the signal generator can be transmitted to the derailleur in a wireless manner, such that there is no need to install signal transmission wire for shifting, thereby providing a wireless and tangle-free experience and an aesthetic appearance of the bicycle.

In addition, the assembly seat is disposed on the end of the handlebar part, such that the antenna is located close to the derailleur and thus improving the efficiency in signal transmission.

Furthermore, the assembly seat is detachably disposed on the end of the handlebar part, or the cover is detachable from the assembly seat, such that it is convenient for changing the battery in the assembly seat.

Moreover, the antenna and the battery are spaced apart from each other, such as respectively disposed on the bottom portion and the sidewall portion of the assembly seat, or arranged in a manner that their orthogonal projections on the circuit board assembly do not overlap with each other. As such, the signal sent by the antenna will not be interfered by the battery so as to maintain the signal quality at a certain level, and the signal transmission is more efficient.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A brake and shift control assembly, configured to be mounted on a bicycle handlebar, the bicycle handlebar comprising two handlebar parts and a middle part connected to and located between the two handlebar parts, and the brake and shift control assembly comprising:
   a brake module configured to be mounted on one of the handlebar parts; and
   a shift control module comprising an assembly seat, a circuit board assembly, a battery, and an antenna, wherein the assembly seat is configured to be disposed on an end of one of the handlebar parts away from the middle part, the circuit board assembly is disposed in the assembly seat, and the battery and the antenna are disposed on the circuit board assembly;
   wherein when the assembly seat is disposed on the end of one of the handlebar parts away from the middle part, the antenna is located outside the bicycle handlebar;
   wherein the assembly seat comprises a bottom portion and a sidewall portion connected to each other, the sidewall portion surrounds the bottom portion, the bottom portion and the sidewall portion together form an accommodation hole therebetween, the end of one of the handlebar parts is inserted into the accommodation hole and is in contact with the sidewall portion, and the circuit board assembly is located in the accommodation hole;
   wherein the circuit board assembly comprises a first circuit board and a second circuit board, the first circuit board is electrically connected to the second circuit board, the first circuit board is disposed on the bottom portion, the second circuit board is disposed on the sidewall portion, the battery is disposed on the first circuit board, and the antenna is disposed on the second circuit board.

2. The brake and shift control assembly according to claim 1, wherein the assembly seat further comprises a sealing component, the sidewall portion has an engaging groove connected to the accommodation hole, the second circuit board is disposed in the engaging groove, the sealing component is disposed at a side of the engaging groove away from the bottom portion, and the sealing component is clamped between the end of one of the handlebar parts and the sidewall portion.

3. The brake and shift control assembly according to claim 1, wherein the brake module comprises a main body and a brake lever, the main body is configured to be mounted on one of the handlebar parts, the brake lever is pivotably disposed on the main body, the shift control module further comprises a signal generator, two shift levers, and a wire, the signal generator is disposed on the brake lever, each of the two shift levers comprises a pivot portion and a push portion connected to each other, the pivot portions of the two shift levers are respectively pivotably disposed on two opposite ends of the brake lever so as to allow the push portions to be movable toward or away from two buttons on the signal generator, and the wire is connected to the circuit board assembly and the signal generator.

4. The brake and shift control assembly according to claim 3, wherein the wire is connected to the assembly seat and disposed on an exterior of one of the handlebar parts.

* * * * *